US009013604B2

(12) United States Patent
Karn et al.

(10) Patent No.: US 9,013,604 B2
(45) Date of Patent: *Apr. 21, 2015

(54) VIDEO SUMMARY INCLUDING A PARTICULAR PERSON

(71) Applicant: Intellectual Ventures Fund 83 LLC, Las Vegas, NV (US)

(72) Inventors: Keith Stoll Karn, Narbeth, PA (US); Bruce Harold Pillman, Rochester, NY (US); Aaron Thomas Deever, Pittsford, NY (US); John Robert McCoy, Webster, NY (US); Frank Razavi, Fairport, NY (US); Robert Gretzinger, Rush, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/141,642

(22) Filed: Dec. 27, 2013

(65) Prior Publication Data

US 2014/0105500 A1 Apr. 17, 2014

Related U.S. Application Data

(63) Continuation of application No. 13/110,056, filed on May 18, 2011, now Pat. No. 8,643,746.

(51) Int. Cl.
*H04N 5/76* (2006.01)
*G06K 9/00* (2006.01)
(Continued)

(52) U.S. Cl.
CPC ........ *G06K 9/00536* (2013.01); *H04N 5/23219* (2013.01); *H04N 5/23229* (2013.01);
(Continued)

(58) Field of Classification Search
USPC .................. 348/208.14, 222.1, 231.99, 231.3
See application file for complete search history.

(56) References Cited

U.S. PATENT DOCUMENTS 3,971,065 A 7/1976 Bayer
5,493,335 A 2/1996 Parulski et al.
(Continued)

FOREIGN PATENT DOCUMENTS

EP 1 970 908 9/2008
JP 2009-010839 1/2009
(Continued)

OTHER PUBLICATIONS

International Preliminary Report on Patentability for PCT/US2012/037714, issued Nov. 19, 2013.
(Continued)

Primary Examiner — Gevell Selby

(57) ABSTRACT

A digital video camera system that provides a video summary using a method that includes: designating a reference image containing a particular person; capturing a video sequence of the scene using the image sensor, the video sequence including a time sequence of image frames; processing the captured video sequence using a video processing path to form a digital video file; during the capturing of the video sequence, analyzing the captured image frames using a person recognition algorithm to identify a subset of the image frames that contain the particular person; forming the video summary including fewer than all of the image frames in the captured video sequence, wherein the video summary includes at least part of the identified subset of image frames containing the particular person; storing the digital video file in the storage memory; and storing a representation of the video summary in the storage memory.

18 Claims, 6 Drawing Sheets

(51) Int. Cl.
*H04N 5/232* (2006.01)
*H04N 21/2743* (2011.01)
*H04N 21/4223* (2011.01)
*H04N 21/44* (2011.01)
*H04N 21/472* (2011.01)
*H04N 21/61* (2011.01)
*H04N 21/8549* (2011.01)
*G06F 17/30* (2006.01)

(52) U.S. Cl.
CPC ....... *H04N21/2743* (2013.01); *H04N 21/4223* (2013.01); *H04N 21/44008* (2013.01); *H04N 21/472* (2013.01); *H04N 21/6125* (2013.01); *H04N 21/8549* (2013.01); *G06F 17/30843* (2013.01)

(56) References Cited

U.S. PATENT DOCUMENTS

| | | | |
|---|---|---|---|
| 5,668,597 | A | 9/1997 | Parulski et al. |
| 5,995,095 | A | 11/1999 | Ratakonda |
| 6,292,218 | B1 | 9/2001 | Parulski et al. |
| 7,035,435 | B2 | 4/2006 | Li et al. |
| 7,483,618 | B1 | 1/2009 | Edwards et al. |
| 7,675,550 | B1 | 3/2010 | Linzer et al. |
| 8,330,849 | B2 | 12/2012 | Ishii |
| 2003/0118329 | A1 | 6/2003 | Obrador |
| 2004/0125877 | A1 | 7/2004 | Chang et al. |
| 2005/0180730 | A1 | 8/2005 | Huh et al. |
| 2007/0024931 | A1 | 2/2007 | Compton et al. |
| 2007/0226624 | A1 | 9/2007 | Peker et al. |
| 2008/0122943 | A1* | 5/2008 | Itoh .................. 348/222.1 |
| 2008/0192129 | A1 | 8/2008 | Walker et al. |
| 2010/0005485 | A1 | 1/2010 | Tian et al. |
| 2010/0104146 | A1 | 4/2010 | Momosaki |
| 2011/0085778 | A1* | 4/2011 | Iwase et al. .................. 386/228 |
| 2011/0292245 | A1 | 12/2011 | Deever |
| 2011/0292288 | A1 | 12/2011 | Deever |
| 2011/0293018 | A1 | 12/2011 | Deever |
| 2011/1292245 | | 12/2011 | Deever |

FOREIGN PATENT DOCUMENTS

| | | |
|---|---|---|
| JP | 2009-077026 | 4/2009 |
| JP | 2010-158046 | 7/2010 |
| JP | 2010-187374 | 8/2010 |
| JP | 2010-219607 | 9/2010 |

OTHER PUBLICATIONS

International Search Report and Written Opinion on PCT/US2012/037714, mailed Oct. 23, 2012.

Non-Final Office Action on U.S. Appl. No. 13/110,056, mailed Feb. 27, 2013.

Notice of Allowance on U.S. Appl. No. 13/110,056, mailed Oct. 3, 2013.

Notice of Allowance on U.S. Appl. No. 13/110,056, mailed Jun. 7, 2013.

Turk et al., "Eigenfaces for Recognition," Journal of Cognitive Neuroscience, vol. 3, pp. 71-86, 1991.

Office Action on Korean Application 10-2013-7033539, issued Jan. 12, 2015 (English translation not available).

Office Action on Japanese Application 2014-511436, mailed Jan. 13, 2015 (English translation not available).

\* cited by examiner

VIDEO SUMMARY INCLUDING A PARTICULAR PERSON

CROSS-REFERENCE TO RELATED PATENT APPLICATIONS

This application is a Continuation of U.S. application Ser. No. 13/110,056, filed May 18, 2011, incorporated herein by reference in its entirety.

FIELD

This disclosure pertains to the field of digital video processing and more particularly to a system and method for forming a digital video summary.

BACKGROUND

Many digital capture devices are capable of capturing video as well as still images. Managing digital video content, however, can be a difficult task. Videos are often represented visually with a thumbnail image of the first frame of the video. This may not provide much insight into the content of the video. Determining if a specific event is contained in a given video often requires viewing the entire video. For a lengthy video, a user may prefer to be able to get a quick summary of the video without having to view the video in its entirety.

Digital videos can also present practical problems from a sharing perspective. Many digital capture devices record video at 30 or 60 frames per second, at spatial resolutions as high as 1920×1080 pixels. Even when compressed, the amount of data generated can make it impractical to share even relatively short videos.

Video editing software can be used to manually summarize a video into a shorter version that can be shared more easily. Manual video editing can be a lengthy, laborious process, however, and many users are not interested in manual editing. Automatic video summarization algorithms exist as well. These solutions start with a captured video as input, and analyze the video to determine a video summary. U.S. Pat. No. 5,995,095 to Ratakonda, entitled "Method for hierarchical summarization and browsing of digital video," discloses a method for generating a hierarchical summary based on keyframes of a video sequence. U.S. Pat. No. 7,035,435 to Li et al., entitled "Scalable video summarization and navigation system and method," describes a method for assigning an importance value to each scene, shot and frame in a video, and using the importance values to determine key frames for a video summary. U.S. Pat. No. 7,483,618 to Edwards et al., entitled "Automatic editing of a visual recording to eliminate content of unacceptably low quality and/or very little or no interest," discloses a method for determining a video summary in which content of low quality or little interest is eliminated from the video.

Automatic video summarization algorithms are very complex, however, as it is necessary to decode the video to perform the analysis required to determine the video summary. Thus it is not possible on a digital capture device to immediately view a video summary corresponding to a just-captured video. This shortcoming makes it difficult to facilitate quick review and sharing of captured videos.

When creating a video summary, it is often desirable to have a specific feature within the summary. The video summary is created to contain some or all of the video content in which a feature is present. Examples of such features can include people, pets, events, locations, activities or objects.

Manually creating such a tailored video summary can be a tedious process. Using desktop software to generate such a tailored video summary prevents the ability to quickly review and share video summaries.

It would thus be desirable to provide systems and methods for computing a video summary in a digital capture device. In particular, it would be desirable to provide solutions that allow a video summary to be generated on a digital capture device with minimal delay at the completion of video capture. Also, it would be desirable to provide a video summary that contains a user-specified feature.

SUMMARY

The present disclosure represents a digital video camera system for capturing a video sequence and providing an associated video summary, comprising:

an image sensor for capturing a digital image;

an optical system for forming an image of a scene onto the image sensor;

a data processing system;

a storage memory for storing captured video sequences; and a program memory communicatively connected to the data processing system and storing instructions configured to cause the data processing system to implement a method for forming a video summary, wherein the method includes:

designating a reference, wherein the reference image contains a particular person;

capturing a video sequence of the scene using the image sensor, the video sequence including a time sequence of image frames;

processing the captured video sequence using a video processing path to form a digital video file;

during the capturing of the video sequence, analyzing the captured image frames using a person recognition algorithm to identify a subset of the image frames that contain the particular person;

forming the video summary including fewer than all of the image frames in the captured video sequence, wherein the video summary includes at least part of the identified subset of image frames containing the particular person;

storing the digital video file in the storage memory; and storing a representation of the video summary in the storage memory.

This disclosure has the advantage that it analyzes the video frames at the time of capture to determine a subset of video frames containing a particular person, thereby eliminating the need to decompress the video data at the time the video summary is created.

It has the additional advantage that it stores a representation of the video summary in storage memory without the need to decompress the stored digital video sequence. This allows a video summary to be generated and viewed on a digital capture device with minimal delay at the completion of video capture.

In some embodiments, the video summary is encoded in a digital video file using metadata without needing to encode the video summary as a separate file. This has the advantage that the video summary is conveniently available for viewing with "smart" video players that understand the video summary metadata while being transparent to conventional players.

DETAILED DESCRIPTION OF THE PREFERRED EMBODIMENTS

Figure 1:
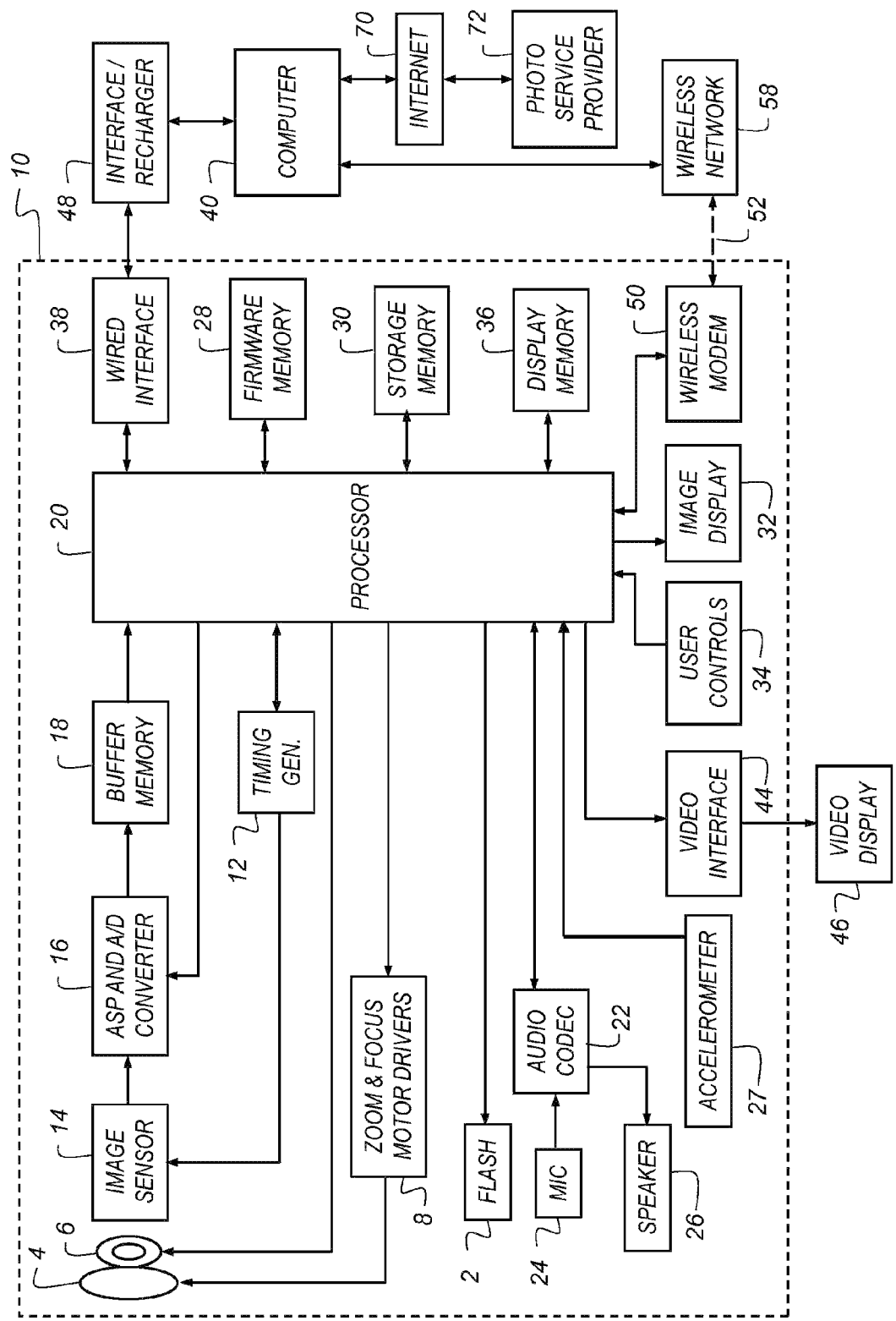
FIG. 1 is a high-level diagram showing the components of a system for forming a video summary.

In the following description, a preferred embodiment of the present disclosure will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present disclosure. Other aspects of such algorithms and systems, and hardware or software for producing and otherwise processing the image signals involved therewith, not specifically shown or described herein, can be selected from such systems, algorithms, components and elements known in the art. Given the system as described according to the disclosure in the following materials, software not specifically shown, suggested or described herein that is useful for implementation of the disclosure is conventional and within the ordinary skill in such arts.

Still further, as used herein, a computer program for performing the method of the present disclosure can be stored in a computer readable storage medium, which can include, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program having instructions for controlling one or more computers to practice the method according to the present disclosure.

The disclosure is inclusive of combinations of the embodiments described herein. References to "a particular embodiment" and the like refer to features that are present in at least one embodiment of the disclosure. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Because digital cameras employing imaging devices and related circuitry for signal capture and processing, and display are well known, the present description will be directed in particular to elements forming part of, or cooperating more directly with, the method and apparatus in accordance with the present disclosure. Elements not specifically shown or described herein are selected from those known in the art.

Certain aspects of the embodiments to be described are provided in software. Given the system as shown and described according to the disclosure in the following materials, software not specifically shown, described or suggested herein that is useful for implementation of the disclosure is conventional and within the ordinary skill in such arts.

The following description of a digital camera will be familiar to one skilled in the art. It will be obvious that there are many variations of this embodiment that are possible and are selected to reduce the cost, add features or improve the performance of the camera.

FIG. 1 depicts a block diagram of a digital photography system, including a digital camera 10 capable of capturing video images in accordance with the present disclosure. Preferably, the digital camera 10 is a portable battery operated device, small enough to be easily handheld by a user when capturing and reviewing images. The digital camera 10 produces digital images that are stored as digital image files using storage memory 30. The phrase "digital image" or "digital image file", as used herein, refers to any digital image file, such as a digital still image or a digital video file.

In some embodiments, the digital camera 10 captures both motion video images and still images. In other embodiments, the digital camera 10 is a digital video camera that captures only motion video images. The digital camera 10 can also include other functions, including, but not limited to, the functions of a digital music player (e.g. an MP3 player), an audio recording device, a mobile telephone, a GPS receiver, or a programmable digital assistant (PDA).

The digital camera 10 includes a lens 4 having an adjustable aperture and adjustable shutter 6. In a preferred embodiment, the lens 4 is a zoom lens and is controlled by zoom and focus motor drives 8. The lens 4 focuses light from a scene (not shown) onto an image sensor 14, for example, a single-chip color CCD or CMOS image sensor. The lens 4 is one type optical system for forming an image of the scene on the image sensor 14. In other embodiments, the optical system may use a fixed focal length lens with either variable or fixed focus.

The output of the image sensor 14 is converted to digital form by Analog Signal Processor (ASP) and Analog-to-Digital (A/D) converter 16, and temporarily stored in buffer memory 18. The image data stored in buffer memory 18 is subsequently manipulated by a processor 20, using embedded software programs (e.g. firmware) stored in firmware memory 28. In some embodiments, the software program is permanently stored in firmware memory 28 using a read only memory (ROM). In other embodiments, the firmware memory 28 can be modified by using, for example, Flash EPROM memory. In such embodiments, an external device can update the software programs stored in firmware memory 28 using the wired interface 38 or the wireless modem 50. In such embodiments, the firmware memory 28 can also be used to store image sensor calibration data, user setting selections and other data which must be preserved when the camera is turned off. In some embodiments, the processor 20 includes a program memory (not shown), and the software programs stored in the firmware memory 28 are copied into the program memory before being executed by the processor 20.

It will be understood that the functions of processor 20 can be provided using a single programmable processor or by using multiple programmable processors, including one or more digital signal processor (DSP) devices. Alternatively, the processor 20 can be provided by custom circuitry (e.g., by one or more custom integrated circuits (ICs) designed specifically for use in digital cameras), or by a combination of programmable processor(s) and custom circuits. It will be understood that connectors between the processor 20 from some or all of the various components shown in FIG. 1 can be made using a common data bus. For example, in some embodiments the connection between the processor 20, the buffer memory 18, the storage memory 30, and the firmware memory 28 can be made using a common data bus.

The processed images are then stored using the storage memory 30. It is understood that the storage memory 30 can be any form of memory known to those skilled in the art including, but not limited to, a removable Flash memory card, internal Flash memory chips, magnetic memory, or optical memory. In some embodiments, the storage memory 30 can include both internal Flash memory chips and a standard interface to a removable Flash memory card, such as a Secure Digital (SD) card. Alternatively, a different memory card format can be used, such as a micro SD card, Compact Flash (CF) card, MultiMedia Card (MMC), xD card or Memory Stick.

The image sensor 14 is controlled by a timing generator 12, which produces various clocking signals to select rows and pixels and synchronizes the operation of the ASP and A/D converter 16. The image sensor 14 can have, for example, 12.4 megapixels (4088×3040 pixels) in order to provide a still image file of approximately 4000×3000 pixels. To provide a color image, the image sensor is generally overlaid with a color filter array, which provides an image sensor having an array of pixels that include different colored pixels. The different color pixels can be arranged in many different patterns. As one example, the different color pixels can be arranged using the well-known Bayer color filter array, as described in commonly assigned U.S. Pat. No. 3,971,065, "Color imaging array" to Bayer, the disclosure of which is incorporated herein by reference. As a second example, the different color pixels can be arranged as described in commonly assigned U.S. Patent Application Publication 2007/0024931 to Compton and Hamilton, entitled "Image sensor with improved light sensitivity," the disclosure of which is incorporated herein by reference. These examples are not limiting, and many other color patterns may be used.

It will be understood that the image sensor 14, timing generator 12, and ASP and A/D converter 16 can be separately fabricated integrated circuits, or they can be fabricated as a single integrated circuit as is commonly done with CMOS image sensors. In some embodiments, this single integrated circuit can perform some of the other functions shown in FIG. 1, including some of the functions provided by processor 20.

The image sensor 14 is effective when actuated in a first mode by timing generator 12 for providing a motion sequence of lower resolution sensor image data, which is used when capturing video images and also when previewing a still image to be captured, in order to compose the image. This preview mode sensor image data can be provided as HD resolution image data, for example, with 1280×720 pixels, or as VGA resolution image data, for example, with 640×480 pixels, or using other resolutions which have significantly fewer columns and rows of data, compared to the resolution of the image sensor.

The preview mode sensor image data can be provided by combining values of adjacent pixels having the same color, or by eliminating some of the pixels values, or by combining some color pixels values while eliminating other color pixel values. The preview mode image data can be processed as described in commonly assigned U.S. Pat. No. 6,292,218 to Parulski, et al., entitled "Electronic camera for initiating capture of still images while previewing motion images," which is incorporated herein by reference.

The image sensor 14 is also effective when actuated in a second mode by timing generator 12 for providing high resolution still image data. This final mode sensor image data is provided as high resolution output image data, which for scenes having a high illumination level includes all of the pixels of the image sensor, and can be, for example, a 12 megapixel final image data having 4000×3000 pixels. At lower illumination levels, the final sensor image data can be provided by "binning" some number of like-colored pixels on the image sensor, in order to increase the signal level and thus the "ISO speed" of the sensor.

The zoom and focus motor drivers 8 are controlled by control signals supplied by the processor 20, to provide the appropriate focal length setting and to focus the scene onto the image sensor 14. The exposure level of the image sensor 14 is controlled by controlling the f/number and exposure time of the adjustable aperture and adjustable shutter 6, the exposure period of the image sensor 14 via the timing generator 12, and the gain (i.e., ISO speed) setting of the ASP and A/D converter 16. The processor 20 also controls a flash 2 which can illuminate the scene.

The lens 4 of the digital camera 10 can be focused in the first mode by using "through-the-lens" autofocus, as described in commonly-assigned U.S. Pat. No. 5,668,597, entitled "Electronic Camera with Rapid Automatic Focus of an Image upon a Progressive Scan Image Sensor" to Parulski et al., which is incorporated herein by reference. This is accomplished by using the zoom and focus motor drivers 8 to adjust the focus position of the lens 4 to a number of positions ranging between a near focus position to an infinity focus position, while the processor 20 determines the closest focus position which provides a peak sharpness value for a central portion of the image captured by the image sensor 14. The focus distance which corresponds to the closest focus position can then be utilized for several purposes, such as automatically setting an appropriate scene mode, and can be stored as metadata in the image file, along with other lens and camera settings.

The processor 20 produces menus and low resolution color images that are temporarily stored in display memory 36 and are displayed on the image display 32. The image display 32 is typically an active matrix color liquid crystal display (LCD), although other types of displays, such as organic light emitting diode (OLED) displays, can be used. A video interface 44 provides a video output signal from the digital camera 10 to a video display 46, such as a flat panel HDTV display. In preview mode, or video mode, the digital image data from buffer memory 18 is manipulated by processor 20 to form a series of motion preview images that are displayed, typically as color images, on the image display 32. In review mode, the images displayed on the image display 32 are produced using the image data from the digital image files stored in storage memory 30.

The graphical user interface displayed on the image display 32 is controlled in response to user input provided by user controls 34. The user controls 34 are used to select various camera modes, such as video capture mode, still capture mode, and review mode, and to initiate capture of still images and recording of motion images. In some embodiments, the first mode described above (i.e. still preview mode) is initiated when the user partially depresses a shutter button, which is one of the user controls 34, and the second mode (i.e., still image capture mode) is initiated when the user fully depresses the shutter button. The user controls 34 are also used to turn on the camera, control the lens 4, and initiate the picture taking process. User controls 34 typically include some combination of buttons, rocker switches, joysticks, or rotary dials. In some embodiments, some of the user controls 34 are provided by using a touch screen overlay on the image display 32. In other embodiments, additional status displays or images displays can be used.

The camera modes that can be selected using the user controls 34 include a "timer" mode. When the "timer" mode is selected, a short delay (e.g., 10 seconds) occurs after the user fully presses the shutter button, before the processor 20 initiates the capture of a still image.

An audio codec 22 connected to the processor 20 receives an audio signal from a microphone 24 and provides an audio signal to a speaker 26. These components can be to record and playback an audio track, along with a video sequence or still image. If the digital camera 10 is a multi-function device such as a combination camera and mobile phone, the microphone 24 and the speaker 26 can be used for telephone conversation.

In some embodiments, the speaker 26 can be used as part of the user interface, for example to provide various audible signals which indicate that a user control has been depressed, or that a particular mode has been selected. In some embodiments, the microphone 24, the audio codec 22, and the processor 20 can be used to provide voice recognition, so that the user can provide a user input to the processor 20 by using voice commands, rather than user controls 34. The speaker 26 can also be used to inform the user of an incoming phone call. This can be done using a standard ring tone stored in firmware memory 28, or by using a custom ring-tone downloaded from a wireless network 58 and stored in the storage memory 30. In addition, a vibration device (not shown) can be used to provide a silent (e.g., non audible) notification of an incoming phone call.

In some embodiments, the digital camera 10 also contains an accelerometer 27 which provides data related to any motion of the camera. Preferably, the accelerometer 27 detects both linear and rotational accelerations for each of three orthogonal directions (for a total of 6 dimensions of input).

The processor 20 also provides additional processing of the image data from the image sensor 14, in order to produce rendered sRGB image data which is compressed and stored within a "finished" image file, such as a well-known Exif-JPEG image file, in the storage memory 30.

The digital camera 10 can be connected via the wired interface 38 to an interface/recharger 48, which is connected to a computer 40, which can be a desktop computer or portable computer located in a home or office. The wired interface 38 can conform to, for example, the well-known USB 2.0 interface specification. The interface/recharger 48 can provide power via the wired interface 38 to a set of rechargeable batteries (not shown) in the digital camera 10.

The digital camera 10 can include a wireless modem 50, which interfaces over a radio frequency band 52 with the wireless network 58. The wireless modem 50 can use various wireless interface protocols, such as the well-known Bluetooth wireless interface or the well-known 802.11 wireless interface. The computer 40 can upload images via the Internet 70 to a photo service provider 72, such as the Kodak Easy-Share Gallery. Other devices (not shown) can access the images stored by the photo service provider 72.

In alternative embodiments, the wireless modem 50 communicates over a radio frequency (e.g. wireless) link with a mobile phone network (not shown), such as a 3GSM network, which connects with the Internet 70 in order to upload digital image files from the digital camera 10. These digital image files can be provided to the computer 40 or the photo service provider 72.

Figure 2:
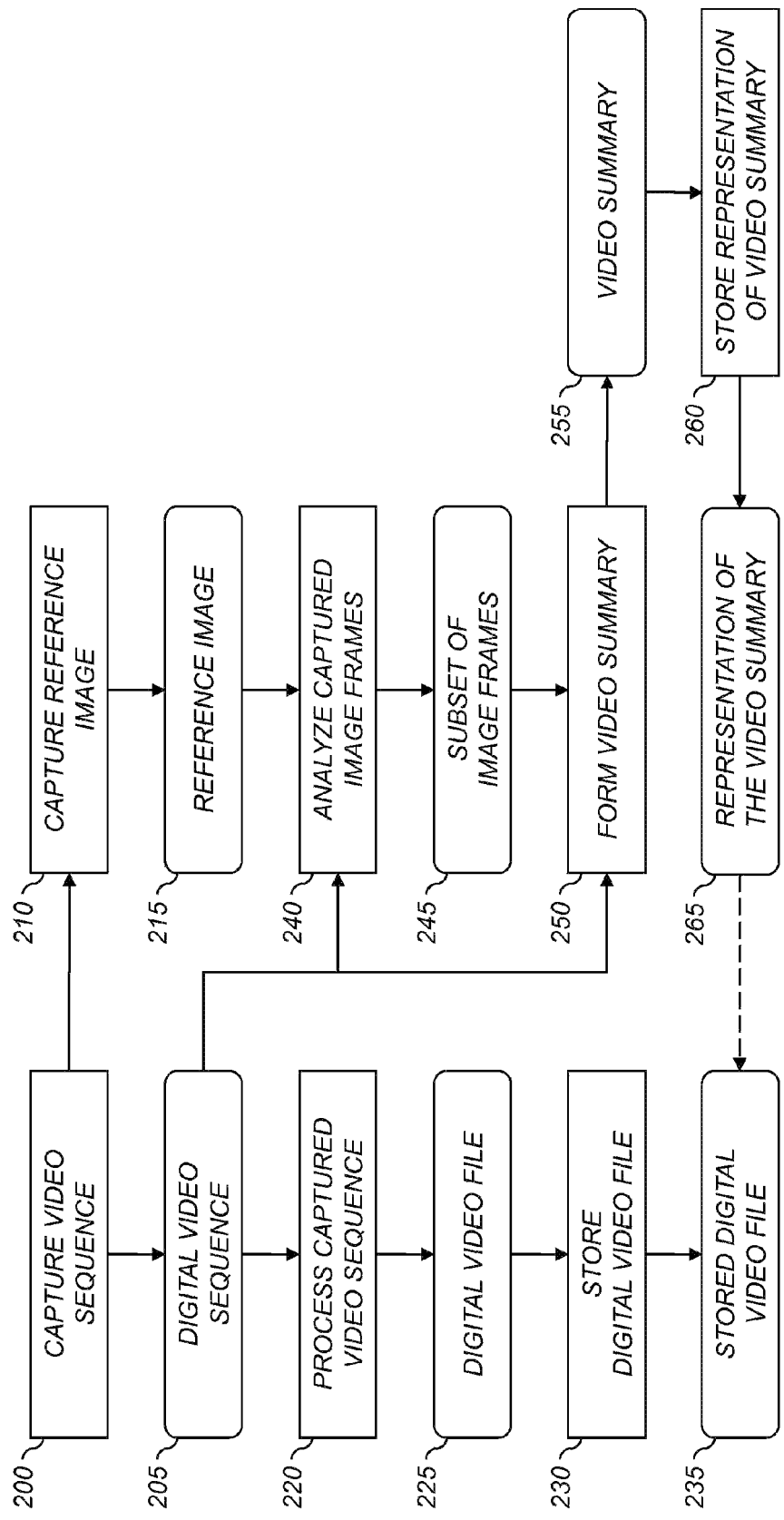
FIG. 2 is a flow diagram of a method for forming a video summary.

The present disclosure will now be described with reference to FIG. 2. Initially, a digital video capture device such as digital camera 10 (FIG. 1) is used in a capture video sequence step 200 to capture a digital video sequence 205 using the image sensor 14, wherein the digital video sequence 205 comprises a time sequence of image frames.

During the capture video sequence step 200, a capture reference image step 210 is performed to capture a reference image 215 using the image sensor 14, wherein the reference image 215 contains a particular person. The reference image 215 can be an image frame from the captured digital video sequence 205, and the reference image 215 can be selected through the use of a user control 34. For example, during video capture a user can request the capture of the reference image 215 by pressing an appropriate user control button, which sends a signal to the processor 20 to designate the current video frame in buffer memory 18 as the reference image 215. The reference image 215 contains a particular person of interest. In a preferred embodiment, the reference image 215 contains the front of the face of the particular person at sufficient spatial resolution to allow facial features to be determined from the reference image 215. In some embodiments, the reference image 215 contains only a single person, and the particular person is identified as the only person in the reference image 215. In other embodiments, the reference image 215 can contain multiple persons, and the particular person can be chosen by any one of many means, including selecting the largest person, selecting the person nearest the center of the reference image 215, selecting the person with the largest visible face or manually selecting the person using an appropriate user interface (e.g., by having a user select the face using a pointing device). Alternatively, each person in the reference image 215 can be designated to be particular persons. In some embodiments, the particular person can be selected by comparing the faces present in the reference image 215 to known faces in a face recognition database, and selecting a known face. In other embodiments, a user interface can be provided to enable the user to manually designate the particular person contained in the reference image 215.

A process captured video sequence step 220 processes the captured digital video sequence 205 using a video processing path to form a digital video file 225. The video processing path can include, for example, a video compression step. Video compression algorithms such as specified in the MPEG and H.263 standards are well-known to those skilled in the art.

During the capture of the digital video sequence 205, an analyze captured image frames step 240 analyzes the image frames in the captured digital video sequence 205 using a person recognition algorithm to identify a subset of the image frames 245 that contain the particular person. In a preferred embodiment, the person recognition algorithm can be a face recognition algorithm, and the analyze captured image frames step 240 identifies image frames containing the same face as the face of the particular person in the reference image. Face recognition algorithms are well-known in the art. For example, Turk et al., in the article "Eigenfaces for Recognition" (Journal of Cognitive Neuroscience, Vol. 3, pp. 71-86, 1991), which is incorporated herein by reference, describes a face recognition algorithm that can be used in accordance with the present disclosure. Alternatively, the person recognition algorithm can be any algorithm that matches a person in an image frame with the particular person in the reference image 215. Such an algorithm can include steps of gender classification, height estimation, and clothing analysis, and can be chosen from among such algorithms known to those skilled in the art.

A form video summary step 250 forms the video summary 255 including fewer than all of the image frames in the captured digital video sequence 205, wherein the video summary 255 includes at least a part of the identified subset of image frames 245 containing the particular person. In one embodiment of the present disclosure, the video summary 255 is formed using only those image frames containing the particular person.

In some embodiments, the video summary 255 includes only a portion of the subset of the image frames 245 containing the particular person. For example, the video summary 255 can be limited to include less that a predefined number of image frames. In an alternate embodiment, the video summary 255 can include a single image frame from each group of contiguous image frames in the subset of the image frames 245. In this way, the video summary 255 can be a "slideshow" comprised of a set of still image selected from the identified subset of the image frames 245 containing the particular person.

In another embodiment, the video summary 255 also includes additional image frames besides the identified subset of image frames 245 containing the particular person. In one embodiment of the present disclosure, the additional image frames include image frames immediately before or after the image frames in the identified subset of image frames 245 containing the particular person. Such frames can be chosen, for example, as transition frames, to allow for a period of transition from one section of the video summary 255 to another. Such frames can also be chosen so that the video summary 255 comprises groups of pictures that can be easily extracted from the digital video file 225. Video compression standards such as MPEG encode video sequences such that some frames are encoded independently (without reference to other frames), and some groups of temporally sequential frames, or groups of pictures, are encoded without reference to any frames outside of the group of pictures. Thus the compressed video data representing such a group of pictures can be extracted from the compressed digital video file 225 without the need to decode compressed video data.

In another embodiment of the present disclosure, the additional image frames include other portions of the captured digital video sequence 205 that are determined to be important portions. These other important portions of the digital video sequence 205 can be identified by executing a keyframe extraction or video summary algorithm. Such algorithms are described in commonly-assigned, co-pending U.S. patent application Ser. No. 12/786,471 to Deever, entitled "Method for determining key video frames," filed May 24, 2011, and commonly-assigned, co-pending U.S. patent application Ser. No. 12/786,483 to Deever, entitled "Video summary method and system," both of which are incorporated herein by reference.

In U.S. patent application Ser. No. 12/786,483, a method for forming a video summary is disclosed in which image frames are analyzed at the time of capture to determine feature values. These feature values are analyzed, without decompressing the compressed digital video sequence, to identify key video snippets that comprise a video summary.

In U.S. patent application Ser. No. 12/786,471, a method for determining key video snippets is disclosed in which the digital video sequence is analyzed, using feature values determined at capture time, to determine an importance value as a function of time. The importance value is used to form a warped-time representation for the digital video sequence. The warped-time representation gives greater temporal weighting to some video frames in the digital video sequence and lesser temporal weighting to others. The warped-time digital video sequence representation is divided into a set of equal temporal intervals. A key video frame is selected from each temporal interval by analyzing the feature values associated with video frames in the corresponding temporal interval. Such criteria can include selecting a key video frame occurring shortly after the completion of a zoom-in process, or selecting a key video frame having a moderate level of local motion in the center region of the video frame.

In some embodiments, key video snippets can be formed by selecting a set of video frames surrounding each of the key video frames. For example, a key video snippet can be formed by selecting two seconds of video frames before and after a key video frame, thus forming a four second long key video snippet.

Alternatively, the key video frames can be ranked and key video snippets formed for only a subset of the key video frames corresponding to the most highly ranked key video frames. Ranking of key video frames can include analyzing the digital video sequence to determine a camera fixation pattern, and ranking the key video frames responsive to the camera fixation pattern. Feature values determined at capture time corresponding to global motion can provide a global motion trace that indicates the fixation region of the camera throughout the digital video sequence. Video frames corresponding to regions of high fixation, that is, regions on which the camera stayed fixated for a high percentage of the overall video capture, are ranked highly. The ranking process can be performed iteratively, selecting the next highest ranking key video frame at each step, and at each step the process can promote key video frames representing unrepresented fixation regions above key video frames representing fixation regions that have already been included in the ranking process. Once the key video frames have been ranked, the top ranking key video frames can be chosen to be included in key video snippets. The additional image frames represented by these key video snippets can be combined with the identified subset of image frames containing the particular person to form the video summary.

A store digital video file step 230 stores the digital video file 225 to storage memory 30 producing a stored digital video file 235. A store representation of video summary step 260 stores a representation of the video summary 265 in the storage memory 30. In one embodiment, storing the representation of the video summary 265 in the storage memory 30 includes storing frame identification metadata providing an indication of the image frames in the digital video sequence 205 corresponding to the video summary 255. The frame identification metadata can be stored in association with the stored digital video file 235. For example, the representation of the video summary 265 can be stored as video summary metadata in the stored digital video file 235 that indicates a series of start frames and end frames that correspond to the snippets contained in the video summary. This allows the representation of the video summary 265 to be stored without using any additional physical memory, other than the small amount of memory required to store the frame identification metadata. The video summary 255 can then be played using a "smart" video player that understands the video summary metadata while being transparent to conventional players.

In another embodiment, the representation of the video summary 265 is a summary digital video file. In this embodiment, the video summary 255 is stored as a separate digital video file from the stored digital video file 235. In this case, the representation of the video summary 265 is a summary digital video file that can be viewed or shared independent of the stored digital video file 235. In a preferred embodiment, the stored representation of the video summary 265 is a summary digital video file in a format adapted to be played using a standard video player.

In some embodiments, the summary digital video file can be created after the capture of the video sequence is completed. The desired frames of the video summary can be extracted from the stored digital video file 235. If the desired frames of the video summary are selected to correspond to independently encoded groups of pictures, the summary digital video file can be created by extracting compressed data corresponding to the desired frames without decoding the compressed video data.

In some embodiments, the summary digital video file is formed from the image frames of the captured digital video sequence 205 using a different video processing path than is used to form the digital video file 225. For example, many video capture devices can simultaneously capture and encode two video streams. In these devices, a single image sensor 14 is used to capture each image frame. Then each image frame is processed using two different processing paths. One processing path can produce the digital video file 225. The second processing path can produce the summary digital video file used to store the video summary 255. The second processing path can differ from the first processing path in that it can generate a reduced spatial resolution version of each image frame, and encode a lower resolution video. Many video capture devices can simultaneously capture a 1080p resolution video and a QVGA resolution video.

Figure 3:
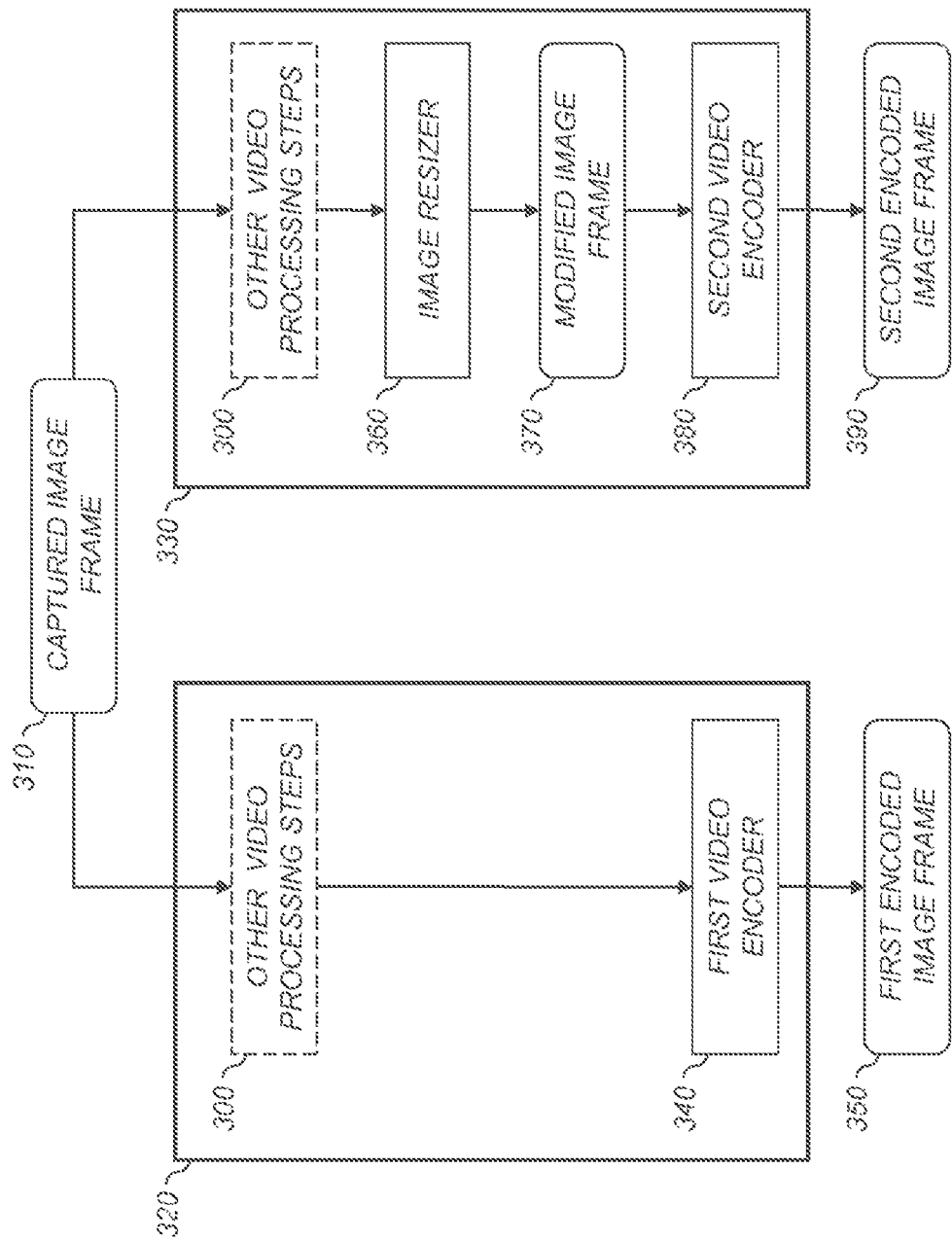
FIG. 3 is a flow diagram illustrating the use of two different video processing paths for processing a digital video sequence.

FIG. 3 illustrates a video capture process having two processing paths. A captured image frame 310 is directed to both a first video processing path 320 and a second video processing path 330. The first video processing path 320 includes a first video encoder 340 that provides a first encoded image frame 350 at a first spatial resolution. The second video processing path 330 includes an optional image resizer 360 that produces a modified image frame 370 with a second spatial resolution. The second video processing path 330 also includes a second video encoder 380 that encodes the modified image frame 370, providing a second encoded image frame 390. Those skilled in the art will recognize that first video processing path 320 and the second video processing path 330 can also optionally include other video processing steps 300 such as color and tone scale processing, noise reduction, sharpening and image stabilization. While these other video processing steps 300 are illustrated as being applied first, it should be recognized that they can be applied at any point within the first video processing path 320 and the second video processing path 330, or even interspersed between the other steps. Those skilled in the art will also recognize that FIG. 3 illustrates one possible way in which two video processing paths can differ, and that other differences are possible that fall within the scope of this disclosure.

Figure 4:
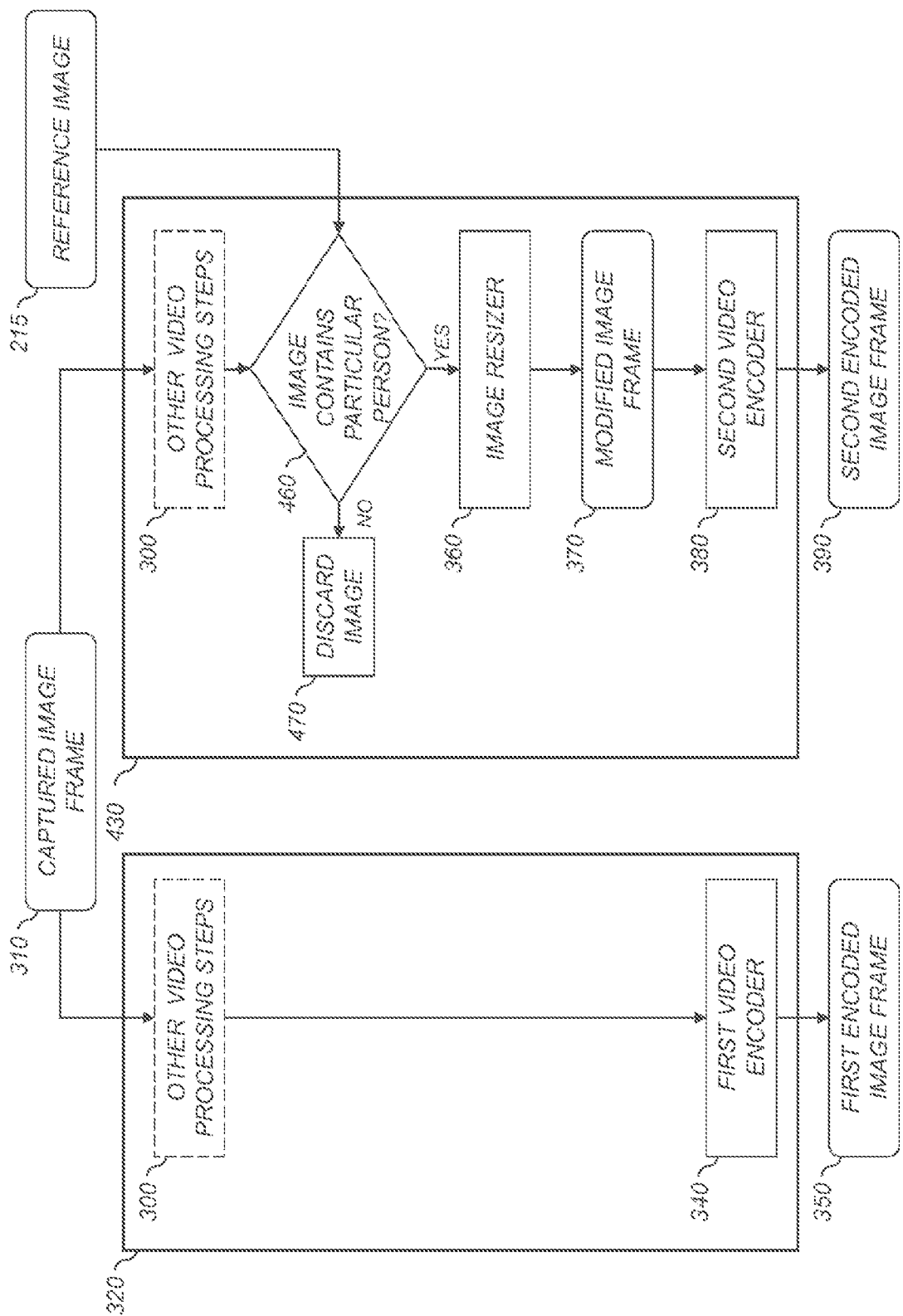
FIG. 4 is a flow diagram illustrating the use of two different video processing paths for processing a digital video sequence according to an alternate embodiment.

Using a different video processing path than is used to form the digital video file 225 (FIG. 2), the summary digital video file can be created concurrently with the digital video file 225. FIG. 4 illustrates a variation of the method shown in FIG. 3 that can be used for the concurrent creation of two video files. As with FIG. 3, each captured image frame 310, is directed through the first video processing path 320 including the first video encoder 340 to produce the first encoded image frame 350. The first encoded image frame 350 is included in the digital video file 225.

The captured image frame 310 is also directed through a second video processing path 430. The second video processing path 430 is analogous to the second video processing path 330 in FIG. 3, except for the addition of an image contains particular person test 460. The image contains particular person test 460 uses a person recognition algorithm to analyze the captured image frame 310 to determine whether it contains the particular person from the reference image 215. If not, the captured image frame 310 is discarded using discard image step 470. If the particular present is present in the captured image frame 310, processing proceeds to the image resizer 360 to determine the modified image frame 370, and to the second video encoder 380 to provide the second encoded image frame 390. The second encoded image frame 390 is included in the summary digital video file. In alternate embodiments, the image resizer 360 can be applied earlier in the second video processing path, prior to the image contains particular person test 460. In other embodiments, the image resizer 360 may not be present in the second video processing path 430 at all.

The first video processing path 320 and the second video processing path 430 illustrated in FIG. 4 are used to generate two separate video files. The first video file (digital video file 225) contains all of the captured image frames 310 and is encoded at a first spatial resolution. The second video file (summary digital video file) contains only those captured image frames 310 containing the particular person of interest, and is encoded at a second spatial resolution. The second video file is formed concurrently with the first video file.

Alternatively, the summary digital video file can be formed only partially concurrently with the digital video file. An initial summary digital video file can be created as illustrated in FIG. 4. After capture is complete, the summary digital video file can be augmented with additional data extracted from the stored digital video file 235. In this case, the summary digital video file can be expanded to contain image frames not originally encoded by the second video processing path. This allows faster generation of the summary digital video file than by forming the entire summary digital video file post-capture.

Figure 5:
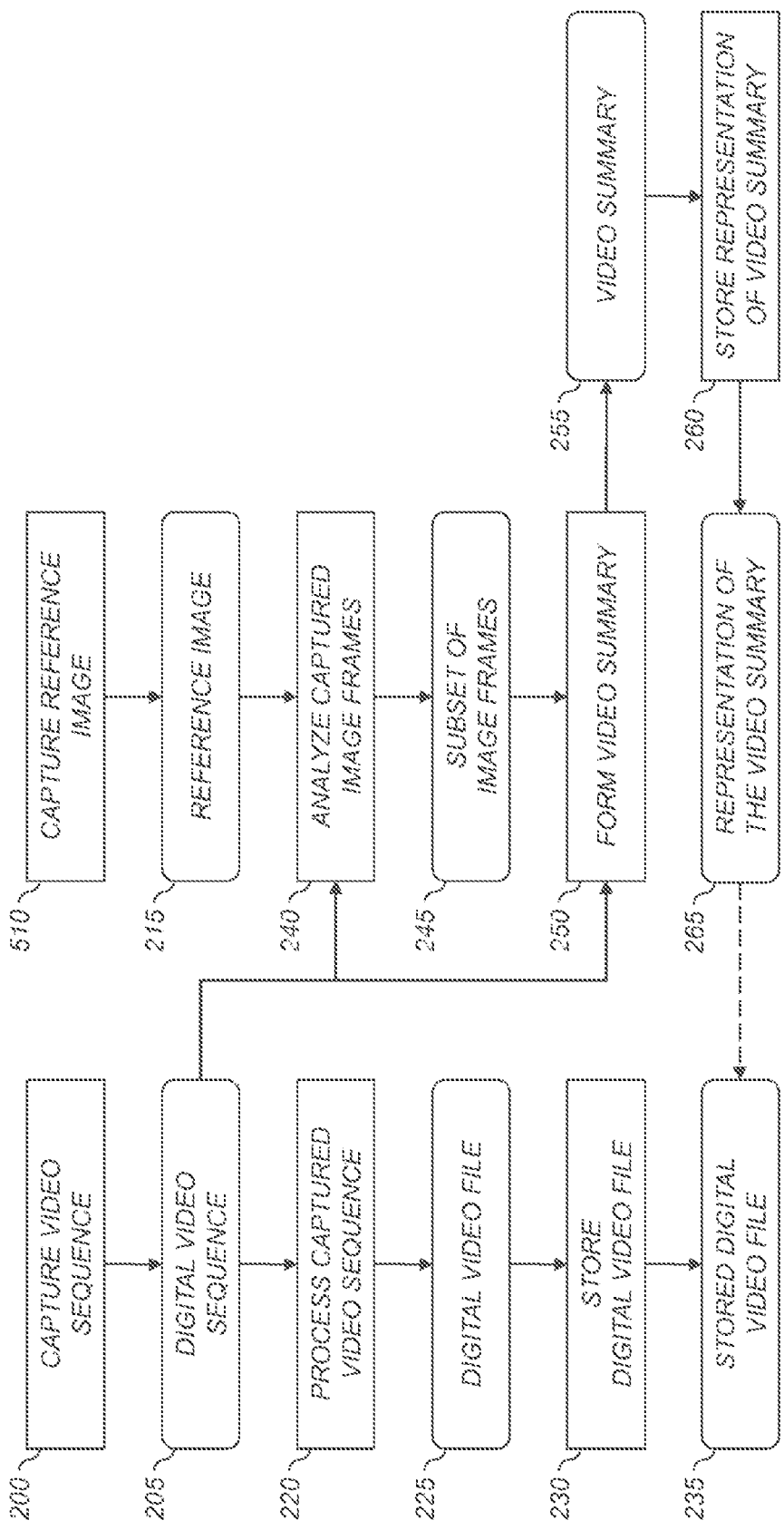
FIG. 5 is a flow diagram of a method for creating video summaries according to a second embodiment.

FIG. 5 illustrates an alternate embodiment of the present disclosure. In this case, the reference image 215 containing the particular person is not captured concurrently with the capture video sequence step 200, but rather is captured in an independent capture reference image step 510, which can be performed either before or after the capture video sequence step 200. The reference image 215 can be a single image obtained in still capture mode, or can be an image frame from an existing captured digital video sequence. In some embodiments, the digital camera can store a set of person images corresponding to a set of persons of interest to the owner of the digital camera (e.g., a person image can be stored for each family member), and the reference image 215 can be selected from the set of person images using an appropriate user interface (e.g., a list of names of predefined persons). The reference image 215 can be captured on the digital camera 10, or alternately can be captured on a separate image capture device and imported into the digital camera 10.

In some embodiments, a plurality of reference images 215 can be designated containing different views of the particular person. The analyze captured image frames step 240 can use the plurality of reference images 215 to help make a more reliable determination of whether an image frame contains the particular person.

In some embodiments, the analyze captured image frames step 240 occurs concurrently with the capture video sequence step 200, so that the video summary 255 is formed concurrently with the generation of the digital video file 225. In other embodiments, the video summary 255 can be formed using a post-processing operation that is performed after the digital video file 225 has been captured and stored. In some cases, the analyze captured image frames step 240 can be performed on the digital camera 10. Alternatively, it can also be performed after the stored digital video file 235 has been loaded onto some other device such as a host computer. The remaining elements in FIG. 5 are equivalent to those shown in the embodiment of FIG. 2.

Figure 6:
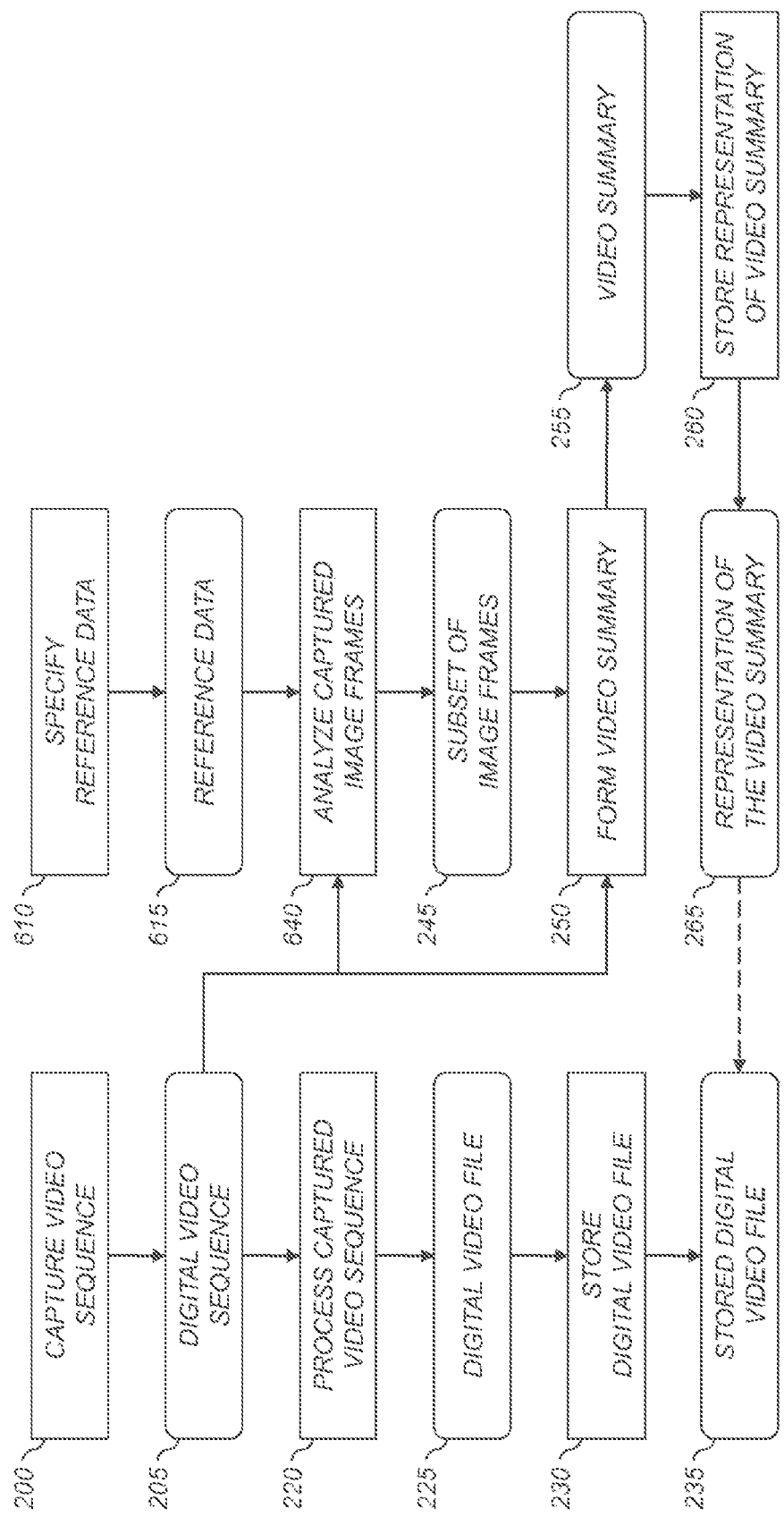
FIG. 6 is a flow diagram of a method for creating video summaries according to a third embodiment.

An alternative embodiment of the present disclosure will now be described with reference to FIG. 6. In this case, rather than analyzing the captured image frames based on a reference image 215, an analyze captured image frames step 640 selects the subset of image frames 245 based on a set of reference data 615 indicating a feature of interest, which is specified in a specify reference data step 610. The remaining elements in the method of FIG. 6 are identical to those shown in the embodiment of FIG. 2.

This reference data 615 can be of many forms. In some embodiments, the reference data 615 can be textual descriptions of features of interest. For example, the reference data 615 can be names of individuals, objects, locations, or events. In some embodiments, the reference data 615 can be mathematical representations of features of interest. For example, the reference data 615 can be color histograms, eigenvalues, templates, or any other feature vector. Those skilled in the art will recognize that there are numerous methods by which image information can be represented within the scope of this disclosure. In some embodiments, the reference data 615 can be associated with non-image information. For example, the reference data 615 can be information associated with audio signals, global positioning system (GPS) data, auto-focus data, auto-exposure data, auto-white balance data, zoom lens data, accelerometer data, gyroscope data or infrared sensor data. Those skilled in the art will recognize that there are a wide variety of types of information that can be provided as the reference data 615 for use by the analyze captured image frames step 640 to identify the subset of image frames 245.

During the capture of the digital video sequence 205, the analyze captured image frames step 640 analyzes the image frames in the digital video sequence 205 using a feature recognition algorithm to identify a subset of the image frames that contain the feature of interest as specified by the reference data 615. For example, if the feature of interest specified by the reference data 615 is a particular named person for which a reference face image has been previously specified, a face recognition algorithm can be used to determine if an image frame contains the particular named person by analyzing the image frame with reference to the reference face image. In another example, if the feature of interest specified by the reference data 615 is an event label (e.g., "golf swing"), a feature recognition algorithm can be used to determine if the image frame corresponds to the specified event. In some cases the feature recognition algorithm may need to analyze a series of image frames to determine the appropriate event label (e.g., to detect which image frames contain motion characteristic of a golf swing). In another example, if the feature of interest specified by the reference data 615 is an object label (e.g., "whale"), a feature recognition algorithm can be used to determine if the image frame contains the specified object. All of these examples are situations in which features of interest can be identified at capture-time to determine the subset of image frames 245 to include in a video summary.

In some embodiments, the feature of interest specified by the reference data 615 can correspond to a general characteristic associated with the image frames. For example, the feature of interest specified by the reference data 615 can be an image frame having low associated camera motion. In this case, a feature recognition algorithm can be used to analyze gyroscope data, accelerometer data or image-based motion estimation data to identify image frames satisfying the specified camera motion condition. Similarly, the feature of interest specified by the reference data 615 can be an image frame that follows after a camera zoom process. In this case, a feature recognition algorithm can be used to analyze zoom lens data or image-based zoom estimation data to identify image frames where a camera zoom has just completed. In another example, the feature of interest specified by the reference data 615 can be an image frame with a large magnitude of object motion in the scene. In this case, a feature recognition algorithm can be used to quantify the amount of object motion in the scene to identify image frames satisfying the object motion condition. Those skilled in the art will recognize that these are only examples of many features of interest and feature recognition algorithms that are within the scope of this disclosure.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present disclosure.

The disclosure has been described in detail with particular reference to certain preferred embodiments thereof, but it will be understood that variations and modifications can be effected within the spirit and scope of the disclosure.

PARTS LIST 2 flash
4 lens
6 adjustable aperture and adjustable shutter
8 zoom and focus motor drives
10 digital camera
12 timing generator
14 image sensor
16 ASP and A/D Converter
18 buffer memory
20 processor
22 audio codec
24 microphone
25 pressure sensor
26 speaker
27 accelerometer
28 firmware memory
30 storage memory
32 image display
34 user controls
36 display memory
38 wired interface
40 computer
42 tilt sensor
44 video interface
46 video display
48 interface/recharger
50 wireless modem
52 radio frequency band
58 wireless network
70 Internet
72 photo service provider
200 capture video sequence step
205 digital video sequence
210 capture reference image step
215 reference image
220 process captured video sequence step
225 digital video file 230 store digital video file step
235 stored digital video file
240 analyze captured image frames step
245 subset of image frames
250 form video summary step
255 video summary
260 store representation of video summary step
265 representation of video summary
300 other video processing steps
310 captured image frame
320 first video processing path
330 second video processing path
340 first video encoder
350 first encoded image frame
360 image resizer
370 modified image frame
380 second video encoder
390 second encoded image frame
430 second video processing path
460 image contains particular person test
470 discard image step
510 capture reference image step
610 specify reference data step
615 reference data
640 analyze captured image frames step

What is claimed is:

1. A method comprising:
receiving a designation regarding a reference image, wherein the reference image contains a particular person;
analyzing, using a processing system, image frames to identify a subset of the image frames that contain the particular person;
forming, using the processing system, a summary including fewer than all of the image frames, wherein the summary includes at least part of the identified subset of image frames containing the particular person; and
storing the summary in storage memory as a separate summary file.

2. The method of claim 1, wherein the image frames are analyzed using a person recognition algorithm.

3. The method of claim 1, further comprising capturing the reference image using an image sensor.

4. The method of claim 1, wherein the image frames are analyzed using a facial recognition algorithm.

5. The method of claim 1, wherein the summary comprises a video summary.

6. The method of claim 5, wherein the video summary also includes additional image frames besides the identified subset of image frames containing the particular person.

7. The method of claim 5, wherein the video summary is a collection of still images selected from the identified subset of image frames containing the particular person.

8. The method of claim 1, wherein the reference image is downloaded to a digital video camera system.

9. An apparatus comprising a processing system, wherein the processing system comprises a processor and a storage memory, and the processing system is configured to:
receive a designation with respect to a reference image, wherein the reference image contains a particular person;
analyze, using the processor, image frames to identify a subset of the image frames that contain the particular person;
form a summary including fewer than all of the image frames, wherein the summary includes at least part of the identified subset of image frames containing the particular person; and
store the summary in the storage memory as a separate summary digital video file.

10. The apparatus of claim 9, wherein the image frames are analyzed using a facial recognition algorithm.

11. The apparatus of claim 10, wherein the summary comprises a video summary.

12. The apparatus of claim 11, wherein the video summary also includes additional image frames besides the identified subset of image frames containing the particular person.

13. The apparatus of claim 11, wherein the video summary is a collection of still images selected from the identified subset of image frames containing the particular person.

14. A non-transitory computer readable medium having stored thereon instructions executable to cause a processing system to perform functions, the functions comprising:
receiving a designation regarding a reference image, wherein the reference image contains a particular person;
analyzing, using a processing system, image frames to identify a subset of the image frames that contain the particular person;
forming, using the processing system, a summary including fewer than all of the image frames, wherein the summary includes at least part of the identified subset of image frames containing the particular person; and
storing the summary in storage memory as a separate summary file.

15. The computer readable medium of claim 14, wherein the image frames are analyzed using a facial recognition algorithm.

16. The computer readable medium of claim 14, wherein the summary comprises a video summary.

17. The computer readable medium of claim 16, wherein the video summary also includes additional image frames besides the identified subset of image frames containing the particular person.

18. The computer readable medium of claim 16, wherein the video summary is a collection of still images selected from the identified subset of image frames containing the particular person.

* * * * *